United States Patent [19]

Shrewsburg et al.

[11] Patent Number: 5,721,046
[45] Date of Patent: Feb. 24, 1998

[54] COMPOSITE SUPPLEMENTAL INFLATABLE RESTRAINT DOORS

[75] Inventors: James E. Shrewsburg, Southgate; Timothy S. Winsky; James D. Hass, both of Riverview, all of Mich.

[73] Assignee: BASF Corporation, Mt. Olive, N.J.

[21] Appl. No.: 584,694

[22] Filed: Jan. 11, 1996

Related U.S. Application Data

[63] Continuation of Ser. No. 181,158, Jan. 12, 1994, which is a continuation-in-part of Ser. No. 972,330, Nov. 6, 1992, abandoned.

[51] Int. Cl.$^6$ ........................................ D02G 3/00
[52] U.S. Cl. .................. 428/304.4; 280/728; 428/308.4; 428/423.1; 428/423.5; 428/423.7; 428/424.2; 428/424.8
[58] Field of Search .................. 280/728; 428/304.4, 428/308.4, 423.1, 423.5, 423.7, 424.2, 424.8

[56] References Cited

U.S. PATENT DOCUMENTS

| | | | |
|---|---|---|---|
| 4,550,153 | 10/1985 | Carver | 528/49 |
| 4,608,214 | 8/1986 | Balle et al. | 264/45.5 |
| 4,964,653 | 10/1990 | Parker | 280/732 |
| 5,059,633 | 10/1991 | Lutter et al. | 521/160 |
| 5,110,647 | 5/1992 | Sawada et al. | 428/43 |
| 5,179,132 | 1/1993 | Minuzo et al. | 521/174 |

FOREIGN PATENT DOCUMENTS 2922769  12/1980  Germany.

OTHER PUBLICATIONS

EPO Search Report, Feb. 28, 1995.
Polyurethanes, Encyclopedia of Polymer Science and Engineering, John Wiley & Sons, Inc. NY 1988, vol. 13, pp. 265–274.
Dumbrow, Polyurethanes, 1957, p. 80–81.

*Primary Examiner*—E. Rollins Buffalow
*Attorney, Agent, or Firm*—Fernando A. Borrego

[57] ABSTRACT

A composite air bag assembly door is disclosed, comprising, an outer-surface layer, a flexible polyurethane foam layer, and a structural support. The polyurethane foam used in the door was designed to withstand the high tensile and tear forces generated by deployment of the air bag. The cohesive strength of the form acts as a bonding agent between the surfacing film or film and the structural support or substrate, helping to ensure that the door remains intact.

7 Claims, No Drawings

COMPOSITE SUPPLEMENTAL INFLATABLE RESTRAINT DOORS

This is a continuation of application Ser. No. 08/181,158 filed Jan. 12, 1994 which is a CIP of 07/972,330, now abandoned.

1. Field of the Invention

The present invention relates to composite supplemental inflatable restraint doors (SIR doors) and method of preparation. Specifically, the composite SIR doors of the present invention consist of a facing material, a two-component polyurethane foam system, and a structural support. The SIR doors of the present invention maintain their structural integrity during deployment of a passenger side air bag, yet have the plush look and feel of the traditional foamed instrument panel.

2. Background of the Invention

Today's automobile dashboards or instrument panels (IP) represent complex molded composite articles generally consisting of a surfacing film, an intermediate foam layer, and a supporting substrate. The addition of passenger side inflatable restraints (air bags) has increased the complexity and presented new problems in dashboard design and manufacture. Air bags are installed in an automobile to protect cabin occupants from injury. In the event of a collision, a rapidly inflating air bag is deployed via a small explosive-like charge to prevent occupant contact with the forward interior surfaces of the vehicle cabin.

Prior to deployment, the air bag must be stored. In general, such a storage assembly will have sides and one closed end, an open end with a moving/rupturable covering, and a reaction plate located between the closed end and the air bag, wherein said reaction plate provides the force necessary to deploy the air bag. This storage assembly is located for the driver side generally in the hub area of the steering wheel. For a passenger side air bag, the storage assembly's preferred position is in the dashboard, in line with the passenger seating area.

Various ways of integrating the air bag assembly into the dashboard to provide a commercially acceptable product have been used. U.S. Pat. No. 5,084,122 comprises locating the air bag assembly in the dashboard covering the open end with the intermediate foam layer and surfacing the film of the dashboard composite and providing stitch-like slits in the area of the composite covering the open end to allow the composite to tear upon deployment of the air bag. A potential disadvantage of this system stems from the fact that there is no structural support for the opening cover making it susceptible to deformation due to thermal and/or mechanical stresses giving the dashboard a flawed appearance. Such deformation is perceived by the consumer as less than desirable. Another similar method of preparing an air bag assembly cover is described in U.S. Pat. No. 4,246,213. This patent provides a cover member which is made up by a bag-shaped inner layer of a polyurethane foam laminate of low density and a bag-shaped outer layer of a polyurethane foam laminate of high density, wherein the laminated high and low density polyurethane foams have at least one aligned cut or slit, which selectively splits upon deployment of the air bag. U.S. Pat. Nos. 4,893,833; 4,925,209; and 5,031,930 disclose air bag systems which utilize a cover door module mounted on the dashboard which opens by means of a hinge when the air bag is deployed.

3. Object of the Invention

It is an object of the present invention to provide a two-component polyurethane foam system for use in an air bag assembly door. This urethane foam was developed to withstand extremely high tensile (70–168 psi), elongation (110–330 percent), and tear forces (Block Tear 7–16 ppi and Graves Tear 14–32 ppi), thus minimizing the possibility of foam debris and occupant injury. The cohesive strength of the foam acts as the bonding agent between the surfacing film and the substrate, ensuring that the entire door remains intact, while the foam itself provides the plush look and feel expected of today's dashboards.

Polyurethane foams commonly used as the intermediate foam layer in dashboard production do not have the physical characteristics of tensile, elongation, and tear strength required to maintain the structural integrity of the composite molded door cover. Hard plastic materials used in air bag door covers in steering wheels, while providing structurally competent articles, lack the necessary look and feel for use in today's molded dashboard assemblies.

4. Detailed Description of the Invention

The composite SIR door of the present invention is comprised of

A) a facing material;

B) a reinforcing structural support member; and,

C) a two-component polyurethane foam system.

The SIR door is mounted to the instrument panel by means of a hinge. The SIR door operates in a manner such that as the air bag expands, the SIR door swings open along the axis of the hinge allowing the air bag to deploy. Typical polyurethane formulations for instrument panels (IP) produce foams that do not have physical properties sufficient to maintain the integrity of the SIR door. It has been found that upon air bag deployment the doors utilizing IP foams tend to separate at both the foam-support and/or foam-facing interfaces, distributing fragments of foam throughout the passenger compartment. The SIR door of the present invention utilizes a polyurethane foam having physical properties sufficient to resist tearing and fragmentation.

The facing material used in the present invention can be any material commonly used in instrument panel production, provided it is flexible. The facing material may be synthetic resins such as polyvinylchloride (PVC), polyurethane, acrylonitrile-butadiene-styrene resin (ABS), polyethylene, polypropylene, polyester, or nylon.

The material comprising the reinforcing structural support member may be made of metals, such as aluminum or steel. It may also be made of a known rigid material molded to a desired shape. Such known materials include fiber-reinforced acrylonitrile-butadiene-styrene (ABS), polyphenylene oxide (PPO resin), or the like.

The foam-producing formulations used in the present invention are two-component systems comprising an A-side, isocyanate, and a B-side resin. Isocyanates that may be used in the present invention are well-known in the art. Aromatic polyisocyanates, such as 2,4-toluene diisocyanate, 2,6-toluene diisocyanate, naphthalene-1,5-diisocyanate, 4,4'-diphenylmethane diisocyanate, and mixtures of the MDI isomers 4,4'- and 2,4-diphenylmethane diisocyanate. MDI is a particularly preferred polyisocyanate. The polyisocyanate is preferably a modified isocyanate prepolymer containing carbodiimide, allophanate, urethane, or isocyanurate structures. Of particular preference are mixtures containing carbodiimide-modified and/or urethane-modified MDI prepolymers, preferably having a number average molecular weight of 300 to 370, and preferably making up 25 TO 50 weight % of the isocyanate blend. The isocyanates of the present invention can be prepared by conventional methods known in the art, e.g., phosgenation of the corresponding organic amines.

The isocyanate reactive polyols contained in the B-side resin are generally hydroxyl group-containing compounds (polyols) useful in the preparation of polyurethanes described in the *Polyurethane Handbook* in Chapter 3, §3.1, pages 42–61, and in *Polyurethanes: Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example, in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene and polyester polyols. They are present in amounts from 60 percent to 85 percent by weight. The former are generally prepared by well-known methods, for example, by the base catalyzed addition of an alkylene oxide, preferably ethylene oxide (oxirane), propylene oxide (methyloxirane), butylene oxide, or tetrahydrofuran to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di-, and trialkanolamines.

Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example, U.S. Pat. Nos. 1,922,451; 2,674,619; 1,922,459; 3,190,927; and 3,346,557.

Polyester polyols also represent preferred polyurethane-forming reactants. Such polyesters are well known in the art and are prepared simply by polymerizing polycarboxylic acids or their derivatives, for example, their acid chlorides or anhydrides, with a polyol. Numerous polycarboxylic acids are suitable, for example, malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example, the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylene-polyoxypropylene glycols. These lists of dicarboxylic acids and polyols are illustrative only and not limiting. An excess of polyol should be used to ensure hydroxyl termination, although carboxy groups are also reactive with isocyanates. Methods of preparation of such polyester polyols are given in the *Polyurethane Handbook* and in *Polyurethanes: Chemistry and Technology*.

Other polyoxyalkylene polyether polyols which may be employed are those which contain grafted therein vinylic monomers. They are present in amounts from 12 percent to 30 percent by weight.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056; the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C, preferably from 75° C. to 135° C.

The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. No. 3,652,659 and Re. 29,014 may be employed in preparing the graft polymer dispersions used in the instant invention, the disclosures of which are incorporated by reference. Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927; and 3,346,557; the disclosures of which are incorporated by reference.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate, or epoxy group; or they may be prepared by employing an organic compound having both ethylenic unsaturation, as a hydroxyl, carboxyl, anhydride, or epoxy group as a reactant in the preparation of the conventional polyol. Representative of such organic compounds include unsaturated mono- and polycarboxylic acids and anhydrides such as maleic acid, and anhydric, fumaric acid, crotonic acid, and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate, and 3-allyloxypropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N- dimethylaminostyrene, acetoxystyrene, methyl-4-vinylbenzoate, phenyoxystyrene, p-vinyldiphenyl sulfide, p-vinylphenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetum; inoacrylate, butyl acrylate, 2-ethylhexyl acrylate, phenyl acrylate, phenyl methacrylate, α-chloroacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxydiethyl ether, vinyl 2-ethylthioethyl ether, vinyl methyl ketone, vinyl ethyl ketone, vinyl phenyl ketone, vinyl phosphonates such as bis(β-chloroethyl) vinyl phosphonate, vinyl ethyl sulfide, vinyl ethyl sulfone, N-methyl-N-vinyl acetamide, N-vinyl-pyrrolidone, vinyl imidazole, divinyl sulfide divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used, and the compounds listed above are illustrative and not restrictive of the monomers suitable for use in this invention. Preferably, the monomer is selected from the group consisting of acrylonitrile, styrene, methyl methacrylate, and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoylhydroperoxide, t-butylhydroperoxide, di-t-butyl peroxide, lauroyl peroxide, butyryl peroxide, diisopropylbenzene hydroperoxide, cumeme hydroperoxide, paramethane hydroperoxide, di-α-cumyl peroxide, dipropyl peroxide, diisopropyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azo-bis(2-methyl)butyronitrile, α,α'-azo-bis(2-methyl)heptonitrile, 1,1-azo-bis(1-cyclohexane)carbonitrile, dimethyl α,α'-azobis(isobutyronitrile), 4,4'-azo-bis(4-cyanopetanoic) acid, azo-bis(isobutyronitrile), 1-t-amylazo-1-cyanocyclohexane, 2-t-butylazo-2-cyano-4-methoxy-4-methylpentane,2-t-butylazo-2-cyano-4-methylpentane, 2-(t-butylazo) isobutyronitrile, 2-t-butylazo-2-cyanobutane, 1-cyano-1-(t-butylazo)cyclohexane, t-butyl peroxy-2-ethylhexanoate, t-butylperpivalate, 2,5-dimethyl-hexane, 2,5-diper-2-ethyl hexoate, t-butyl perneo-decanoate, t-butyl perbenzoate, t-butyl percrotonate, persuccinic acid, diisopropyl peroxydicarbonate, and the like; a mixture of initiators may also be used. Photochemically sensitive radical generators may also be employed. Generally from about 0.5 percent to about 10 percent, preferably from about 1 percent to about 4 percent, by weight of initiator based on the weight of the monomer, will be employed in the final polymerization.

Stabilizers may be employed during the process of making the graft polymer dispersions. One such example is the stabilizer disclosed in U.S. Pat. No. 4,148,840, which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol.

Any suitable catalyst may be used including tertiary amines such as triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Other suitable catalysts include the organometallic catalysts, for example, dibutyltin dilaurate, dibutyltin diacetate, stannous chloride, dibutyltin di-2-ethyl hexanoate, stannous oxide, as well as other organometallic compounds such as are disclosed in U.S. Pat. No. 2,846,408. Catalysts are present in amounts from 0.2 percent to 1.2 percent by weight. Tin-containing organometallic catalysts provide foams with especially good aging properties, and are especially preferred.

Chain extending and/or crosslinking agents employed in the preparation of polyurethane foams include those having two functional groups bearing active hydrogen atoms. A preferred group of chain extending agents includes ethylene glycol, diethylene glycol, propylene glycol, or 1,4-butanediol.

Additives which may be used in the process of the present invention include known pigments, such as carbon black, dyes, and flame retarding agents (e.g., tris-chloroethyl phosphates or ammonium phosphate and polyphosphate), surfactants, such as the well-known silicon surfactants, stabilizers against aging and weathering, plasticizers, such as gamma butyrolactone, fungistatic and bacteriostatic substances, and fillers.

The main blowing and density controlling agent used according to the present invention is water. It is present in amounts from 0.3 percent to about 2.0 percent by weight.

The foams used in the present invention are flexible foams exhibiting physical properties not found in typical IP foams. These physical properties, which unexpectedly provide SIR doors with the desired airbag deployment performance, include: Percent Elongation from about 110 to about 330 percent; Tensile Strength from about 70 to about 168 psi; Block Tear from about 7 to about 16 ppi; and Graves Tear (at room temperature) values from about 14 to about 32 ppi. These physical properties can be achieved by techniques used in the polyurethane foam art. For example, percent elongation can be affected by selection of the polyisocyanate used to form the polyurethane. Polyisocyanate blends containing carbodiimide-modified or urethane-modified MDI prepolymers, preferably having a number average molecular weight of 300 to 370, and preferably making up 25 TO 50 weight % of the isocyanate blend, have been found to be useful in providing the necessary percent elongation. By comparison, standard polymeric MDI does not usually provide sufficient percent elongation for practice of the present invention. The addition of chain-extension agents, such as ethylene glycol or 1,4-butane diol, to the reaction mixture can be used to increase the tear strengths (block and Graves) as needed to satisfy the requirements of the invention. Also, increasing the density of the foam tends to increase foam strength (tear strengths and tensile strength). Density can be increased by decreasing the amount of water blowing agent in the reaction mixture, or increasing the packing factor of the foam.

Having set forth the invention, the following examples are given by way of illustration and should not be construed as limiting in nature:

Polyol A is a trimethylolpropane-initiated polyoxypropylene polyoxyethylene block copolymer having a hydroxyl number of about 25 and a nominal molecular weight of 5,140.

Polyol B is a glycerine-initiated polyoxyethylene-polyoxypropylene heteric copolymer having a hydroxyl number of about 46 and a nominal molecular weight of 3,600.

Polyol C is a 31 percent solids, 1:1 acrylonitrile:styrene copolymer dispersed in a trimethylolpropane-initiated polyoxypropylene polymer having a polyoxyethylene cap and a hydroxyl number of about 25.

Polyol D is a dipropylene glycol-initiated polyoxypropylene-polyoxyethylene block copolymer having a hydroxyl number of about 29 and a nominal molecular weight of 3,473.

Polyol E is a glycerine-initiated polyoxypropylene-polyoxyethylene block copolymer having a hydroxyl number of about 27 and a nominal molecular weight of 4,047.

Polyol F is a toluenediamine-initiated polyoxyethylene polymer having a hydroxyl number of about 450 and a nominal molecular weight of 494.

Polyol G is a trimethylolpropane-initiated polyoxypropylene-polyoxyethylene block copolymer having a hydroxyl number of 35 and a nominal molecular weight of 4,121.

LEXOREZ is a crosslinked poly(diethylene glycol, neopentyl glycol, 1,6-hexanediol 1721-65 adipate) having a hydroxyl number of about 65 and a nominal molecular weight of 3,780.

PPK 839 is a 10 percent by weight carbon black dispersed in a dipropylene glycol-initiated polyoxypropylene-polyoxyethylene block copolymer having a hydroxyl number of about 29 and a nominal molecular weight of 3,473.

METACURE T-5 is an alkyl tin catalyst available from Air Products Corp.

XF-F1045 is a proprietary catalyst blend available from Air Products Corp.

DABCO BL-19 is bis(dimethylaminoethyl)ether.

DABCO 33LV® is triethylenediamine in dipropylene glycol.

Q2-5212 is methyl(propylhydroxide, ethoxylated) bis (trimethylsiloxy)silane available from Dow Corning.

HexChem 977 is potassium octoate in dipropylene glycol.

B-4113 is a silicone surfactant available from Goldschmidt.

ISO 1 is a 50:50 mixture of a liquid solvent free carbodiimide modified 4,4'-diphenylmethane diisocyanate and a solvent free urethane modified diphenylmethane diisocyanate.

ISO 2 is a polymethylene polyphenylisocyanate.

All amounts given are in weight percent unless otherwise indicated.

Examples 1, 2 and 4 were prepared using standard hand mix and open pour techniques. Predetermined amounts of resin and iso were added to a container. The resin and iso were mixed for about 8 seconds at about 3,000 rpm using a Lighting mixer equipped with a German mix blade. The mixture was poured into a preheated prepared mold. The mold was then clamped shut. The foam product was demolded and tested. All tests were performed using standard ASTM procedures.

Example 3, a preferred embodiment, was prepared as a "machine" mix. A PU-15 machine equipped with a 10 mm Cannon "L" head was used rather than hand mixing. The resin and iso were preheated to 110° F. and shot into a preheated prepared mold. The mold was then clamped shut. The foam product was demolded and tested.

EXAMPLES

| EXAMPLES | | | | |
|---|---|---|---|---|
| EXAMPLES | 1 | 2 | 3 | 4 |
| POLYOL A | — | 62.04 | — | — |
| POLYOL B | — | 0.96 | 3.01 | 1.00 |
| POLYOL C | 15.00 | 28.90 | 15.15 | 15.00 |
| POLYOL D | — | — | 74.22 | 75.41 |
| POLYOL E | 78.45 | — | — | — |
| LEXOREZ 1721-65 | — | 1.64 | 2.01 | 2.00 |
| PPK 839 | — | 1.93 | — | — |
| METACURE T-5 | — | — | 0.02 | — |
| XF-F1045 | — | — | 0.13 | — |
| DABCO BL-19 | 0.20 | — | 0.05 | 0.20 |
| DABCO 33LV® | 0.40 | 0.48 | — | 0.40 |
| Q2-5212 | 0.50 | 0.29 | — | 0.70 |
| ETHYLENE GLYCOL | 4.70 | 1.93 | 4.75 | 4.70 |
| WATER | 0.75 | 1.83 | 0.56 | 0.59 |
| TRIETHYLAMINE | — | — | 0.10 | — |
| ISO 1 | 45.3 | 52.0 | 45.3 | 46.1 |

TABLE I

| EXAMPLES | 1 | 2 | 3+ | 4 |
|---|---|---|---|---|
| CORE DENSITY (pcf) | 15.23* | 7.48 | 11.85 | 13.46* |
| TENSILE STRENGTH (psi) | 102.6 | 71.9 | 143 | 111.0 |
| ELONGATION (%) | 143.0 | 170.0 | 234.5 | 246.7 |
| BLOCK TEAR (ppi) | 8.48 | 7.0 | 9.1♦ | 10.8 |
| GRAVES TEAR 77° F. (ppi) | 21.75 | 14.9 | 24.1 | 25.5 |

\* = MOLDED
+ = MACHINE MIX
♦ = SPLIT TEAR

COMPARATIVE EXAMPLE I

Comparative Example I was prepared using the same technique as used for Examples 1, 2 and 4. Results of the physical tests are listed below:

| POLYOL B | 0.94 | ISO 2 | 47.0 |
|---|---|---|---|
| POLYOL C | 9.36 | CORE DENSITY (pcf) | 7.24 |
| POLYOL F | 2.81 | TENSILE (psi) | 32.2 |
| POLYOL G | 79.71 | ELONGATION % | 53 |
| LEXOREZ 1721-65 | 1.59 | BLOCK TEAR (ppi) | 2.1 |
| PPK 839 | 1.88 | | |
| B 4113 | 0.20 | | |
| BL 19 | 0.08 | | |
| HEXCHEM 977 | 0.24 | | |

| | -continued |
|---|---|
| METACURE T-5 | 0.01 |
| TRIETHANOLAMINE | 0.98 |
| WATER | 2.20 |

Foam blocks, using the formulation of Example 2 were prepared having various vinyl surfacing films. The foam-vinyl composite was then tested to determine the strength of the adhesive bond between the foam and the vinyl.

TABLE II

| EXAMPLE | VINYL | ADHESION (ppi) |
|---|---|---|
| 2 | RED FORMULA IV | 4.63 |
| 2 | RED FORMULA IV (co-extruded) | 2.28 |
| 2 | PVC CAST (RED) | 0.53 |
| 2 | PVC CAST (GREY) | 0.55 |

Red Formula IV is a PVC, acrylonitrile-butadiene blend. Red Formula IV (co-extruded) is a PVC, acrylonitrile-butadiene blend co-extruded with an acrylonitrile-butadiene sheet. PVC Red and Grey are both cast polyvinylchloride sheets.

The improved physical characteristics, such as tensile strength, elongation, and tear resistance, are shown in Table I for Examples 1–4. The comparative example represents a typical IP foam formulation and its physical properties. Table II illustrates the adhesion of the foam to various surface materials.

Having thus described the invention, we claim:

1. A composite supplemental inflatable restraint door comprising:

A. a facing material;
B. a reinforcing structural support member; and,
C. a two-component flexible polyurethane foam system serving as a bonding agent between said facing material and said structural support member, comprising the reaction product of:
  1) at least one diisocyanate, and,
  2) a resin, comprising
    a) a polyol,
    b) a catalyst,
    c) a chain extender and/or crosslinker,
    d) a surfactant,
    e) water, as a blowing agent, and,
    f) optionally fillers, pigments, flame retardants, and plasticizers;

wherein the flexible polyurethane foam has a tensile strength of between 70 and 168 psi, an elongation between 110 and 330 percent, a block tear between 7 and 16 ppi, and a Graves tear, at room temperature, of 14 to 32 ppi.

2. A door as claimed in claim 1, wherein the facing material is selected from the group of synthetic resins consisting of polyvinylchloride, polyurethane, acrylonitrile-butadiene-styrene, polyethylene, polypropylene, polyester, nylon, and mixtures thereof.

3. A door as claimed in claim 1, wherein the structural support member is selected from the group consisting of aluminum, steel, fiber-reinforced acrylonitrile-butadiene-styrene, and polyphenylene oxide resin.

4. A door as claimed in claim 1, wherein the polyol is selected from the group consisting of polyether polyols, polyester polyols, polyols essentially free of ethylenic unsaturation, and mixtures thereof.

5. A door as claimed in claim 1, wherein the diisocyanate is a mixture of a carbodiimide-modified diphenylmethane diisocyanate and a urethane-modified diphenylmethane diisocyanate.

6. A door as claimed in claim 1, wherein the catalyst is a tin-containing organometallic catalyst.

7. A door as claimed in claim 1, wherein said mixture of diisocyanates comprises 25–50% by weight carbodiimide-modified or urethane-modified prepolymers having a number average molecular weight of 300 to 370.

* * * * *